June 2, 1959     O. H. DRAGER     2,888,870
SAND OR EARTH FILTER FOR SHELTERS

Filed Feb. 17, 1956     4 Sheets-Sheet 1

INVENTOR
Otto Heinrich Drager

BY Bailey, Stephens & Huettig
ATTORNEYS

June 2, 1959  O. H. DRAGER  2,888,870
SAND OR EARTH FILTER FOR SHELTERS
Filed Feb. 17, 1956  4 Sheets-Sheet 3

INVENTOR
Otto Heinrich Drager
BY
Bailey, Stephens & Huettig
ATTORNEYS

June 2, 1959  O. H. DRAGER  2,888,870
SAND OR EARTH FILTER FOR SHELTERS
Filed Feb. 17, 1956  4 Sheets-Sheet 4

INVENTOR
Otto Heinrich Drager

BY Bailey, Stephens & Huettig
ATTORNEYS

United States Patent Office 2,888,870
Patented June 2, 1959

2,888,870

SAND OR EARTH FILTER FOR SHELTERS

Otto Heinrich Drager, Lubeck, Germany

Application February 17, 1956, Serial No. 566,302

Claims priority, application Germany February 23, 1955

6 Claims. (Cl. 98—1)

This invention relates to sand or earth filters for shelters, particularly underground air raid shelters.

The objects of this invention are to improve upon the air raid shelters described in my copending application Serial No. 477,843, filed December 27, 1954 for "Sand or Earth Filter," now Patent No. 2,830,675; to save space by confining the filter material; and to improve upon the filter structure.

In one form of this invention, the escape shaft has its bottom approximately level with the shelter floor. This shaft is partially or fully filled with filter material poured in from the top and over a filter supporting unit. Heretofore a filter material flowed into the shelter until halted by its natural slope angle. To permit egress through the shaft, the filter material is scooped into the shelter thus freeing the shaft for exit.

In order to save space in the shelter, the filter material is confined to the shaft of this invention by means of a door or partition placed in the opening between the shaft and the shelter. This door can be hinged to the wall of the opening or may be slidably mounted for removal.

An air suction means such as a bellows may be mounted on the door and connected by a removable air duct to the filter material support resting on the bottom of the shaft. This support is composed of bent plates arranged with their concave surfaces downward with openings between the plates so that air can enter the unit through the open sides and be pulled through the air duct. In a modified form, the door or partition can be composed of a grate, or an apertured or perforated plate. This form is preferred where the air circulator is arranged elsewhere from the door and blows air out of the shelter.

The top of the escape shaft is surmounted by a cover which can be removed from the inside and which permits air to enter the shelter while keeping out rain. Also climbing rungs are set into the wall of the escape shaft.

Another improvement lies in the provision of two filter material chambers in the escape shaft. Each chamber is filled with suitable material such as sand, earth, activated carbon, or other granulated material which rests on filter material supports as aforesaid. By having two filter units, one filter is always available should the other filter be freed of material in a premature use of the shaft, as may occur in a panic. The two filter material supports are connected by air ducts to an air suction device. A valve is inserted in the joint in the duct leading to each unit. Thus one filter chamber can suffice for the shelter, and either filter chamber can be used. Furthermore, the bottom of one chamber is provided with a trap door so as to permit egress through that chamber, and means are provided so that the valve is automatically actuated to serve the other filter chamber when the trap door is opened. This insures that a source of filtered air is always available.

The means by which the objects of this invention are obtained are described more fully with reference to the accompanying schematic drawings, in which.

Figure 1:
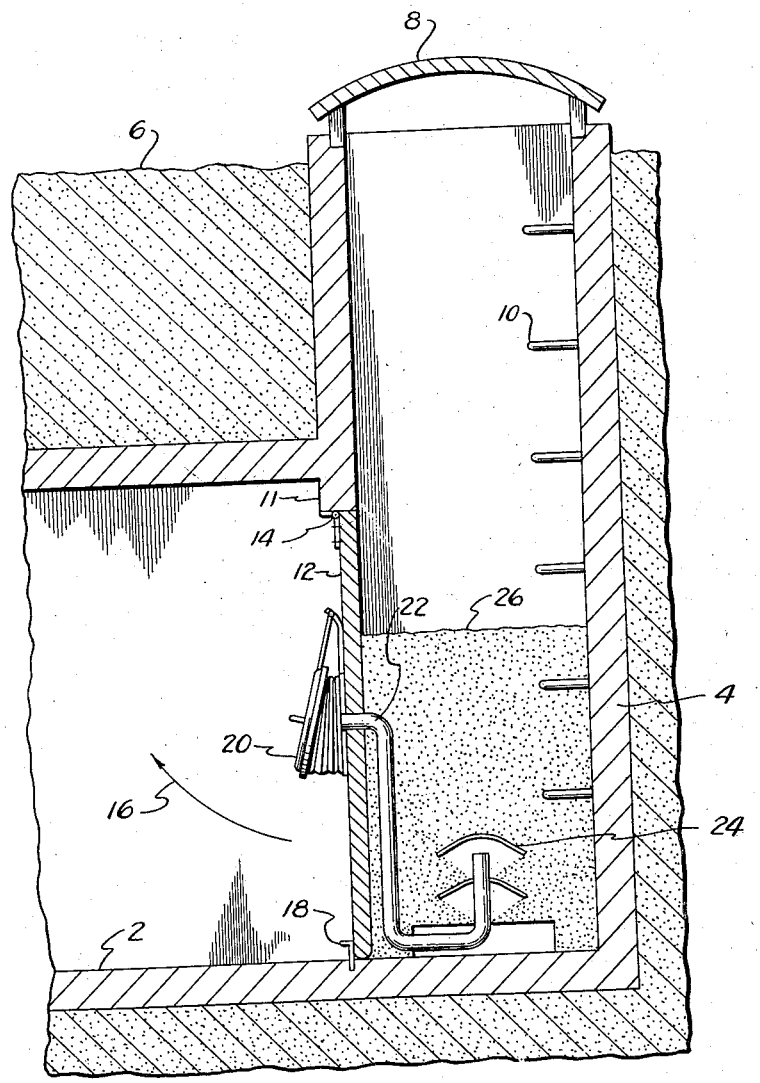
Figure 1 is a vertical cross-sectional view through a portion of a shelter and the escape shaft therefor.

As seen in Figure 1, an air raid shelter 2 communicates with an escape shaft 4 which rises to a point above the surface of the ground 6. The top of the shaft has a cover 8 which is spaced from the upper edge of the shaft to permit the entrance of air and yet shield the shaft from rain. Rungs 10 are set in a wall of the shaft for climbing purposes.

The bottom of shaft 4 is at substantially the same level as the floor of shelter 2. The wall 11 between the shelter and the shaft contains a doorway which is closed by a removable door or partition 12.

The upper end of door 12 is joined to a hinge 14 to permit door 12 to swing into the shelter in the direction of the arrow 16. The lower end of partition 12 is held in place by a pin 18 which can be knocked away when desired.

Mounted on door 12 is an air bellows 20 connected by air duct 22 to the filter material support 24. This support is composed of bent plates which may be of iron or ceramic. The superimposed plates being spaced in order to allow air passage therebetween and into the air duct 22. This duct is removably connected to bellows 20 so that it is disconnected when door 12 is opened.

Granular filter material 26 is poured into shaft 4 and on top of filter support 24. When bellows 20 is operated, air is drawn through material 26 and into air duct 22 and from there into shelter 2.

In order to clear the shaft, pins 18 are removed and door 12 swung in the direction of arrow 16. A filter material thus flows into shelter 2 and if necessary scooped into the shelter to free shaft 4. By reason of having the hinge 14 at the upper edge of door 12, the advantage exists in that when the door is opened it is not constantly under the full pressure of the filter material in the shaft.

Door 12 can also be hinged on its bottom edge rather than at the top. When the door is opened it will fall to the floor and in that position will not interfere with the ready exit of persons from the shelter into the shaft. Again, air duct 22 must be removably attached to door 12.

Figure 2:
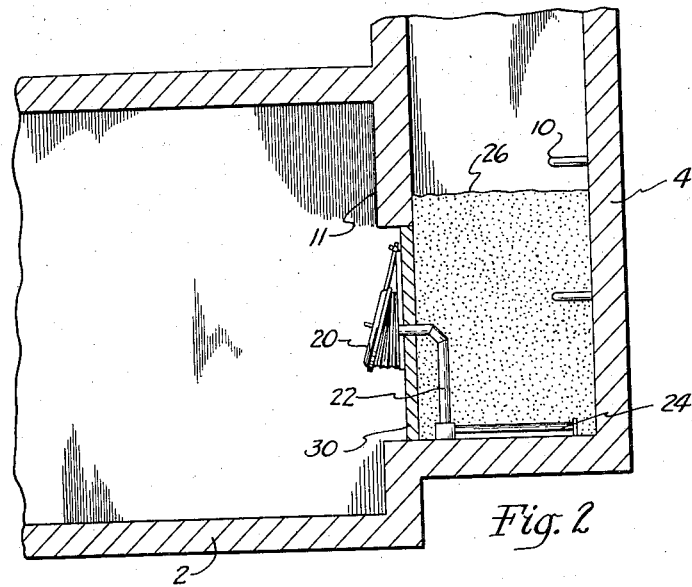
Figure 2 is a similar view of a modified form of the invention.
Figure 3:
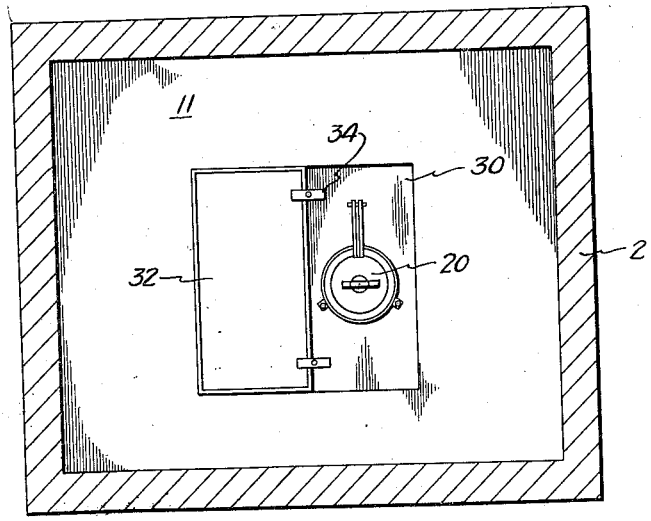
Figure 3 is a side view of Figure 2.

In Figures 2 and 3 the partition is composed of a vertical stationary section 30 upon which is mounted bellows 20 and a vertical removable door section 32. Turnable closure arms 34 are pivoted to section 30 and extend over section 32 to hold the latter in place. These arms can be manually turned in order that door section 32 can be opened.

Figure 4:
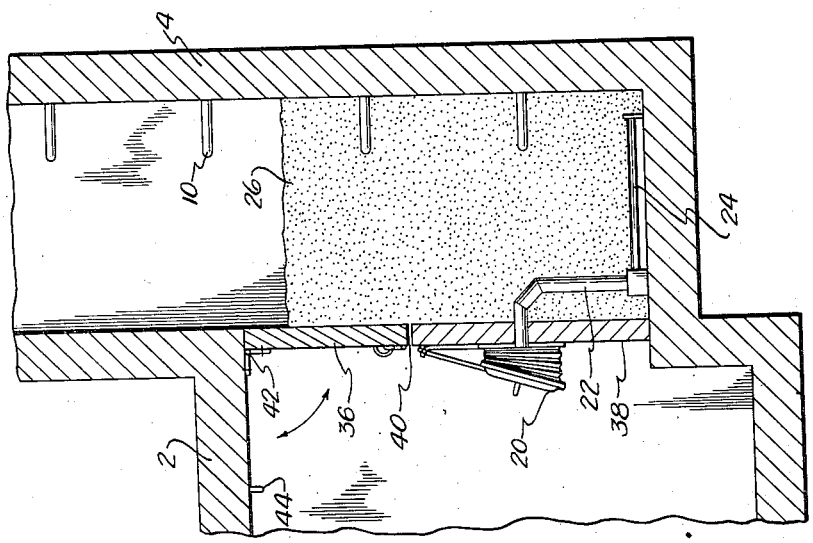
Figure 4 is a vertical cross-sectional view of another modification.

In Figure 4, two partition sections are again used. The upper section 36 extends horizontally above the lower section 38 with a horizontal joint 40 therebetween. Bellows 20 is mounted on lower section 38. Upper section 36 is secured to the shelter ceiling by hinge 42 so that when the section is swung open it can be held open by a hook 44. Lower section 38 can be either fixed to the shelter walls, or it can be removably mounted in the opening.

Figure 5:
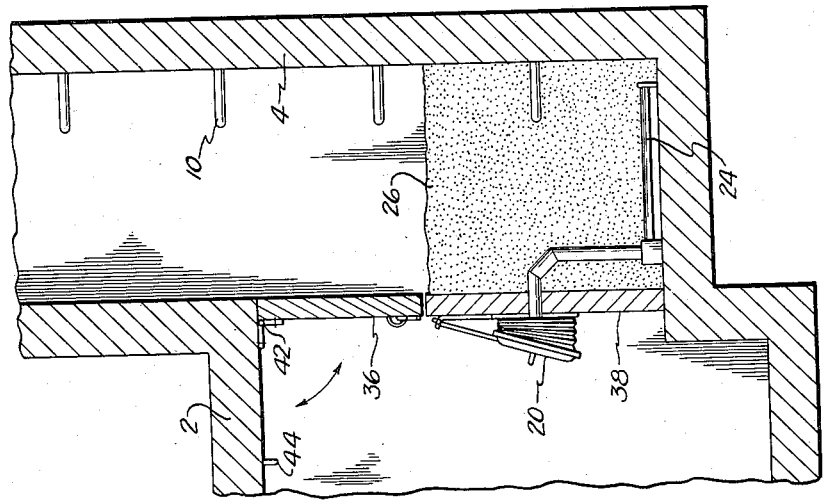
Figure 5 is a view similar to Figure 4 but showing a variation in the amount of filter material.

Figure 5 is similar to Figure 4 except for the fact that the filter material does not extend above the upper edge of partition 38. To enter shaft 4, it is thus only necessary to open the upper door section 36. In this case, no filter material will spill into the shelter and the sand filter remains intact. It is apparent in Figure 4 that the filter material will flow into the shelter when door section 36 is opened. The arrangement of Figure 5 has the advantage in that people can immediately return to the shelter if necessary and thus the shelter can be continuously used with the filter system always available.

Figure 6:
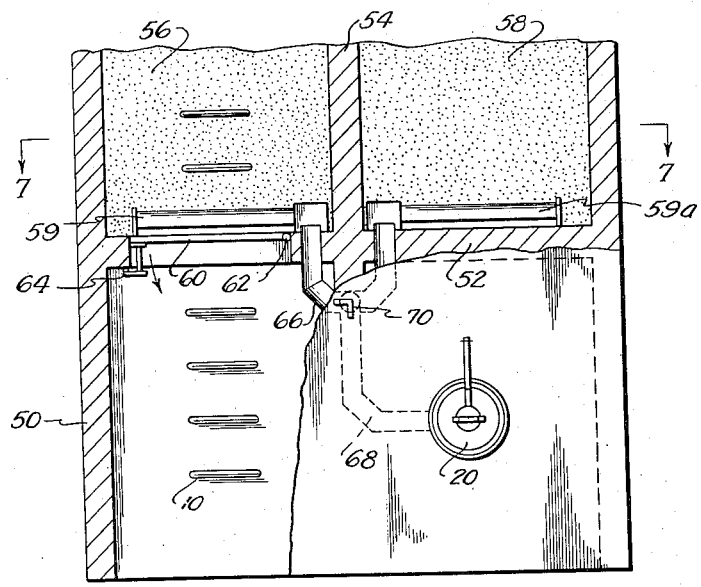
Figure 6 is a vertical cross-sectional view through the escape shaft with dual filter chambers.
Figure 7:
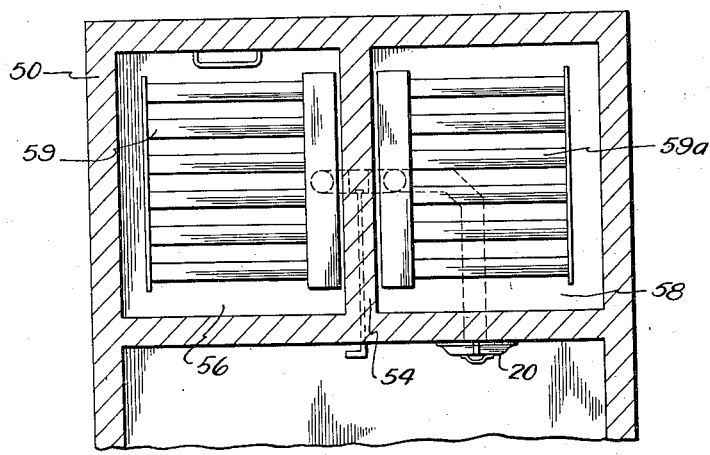
Figure 7 is a cross-sectional view taken on the line 7—7 of Figure 6.

In Figures 6 and 7, the filter shaft 50 has a horizontal bottom wall 52 extending thereacross, and a median vertical wall 54 dividing the filter shaft into two similar filter chambers 56 and 58, respectively. On the bottom of chamber 56 is the filter material support 59 resting upon a trap door 60 secured on one side by a hinge 62 and on the other side by a latch 64. When the latch is opened, the trap door will swing downwardly and drop filter support 59 and the filter material into the bottom of the shaft thus freeing the shaft or exit.

Chamber 58 has a similar filter support 59a resting on bottom 52. Each filter unit is connected by one of the arms of a U-shaped air duct 66 to a single air duct 68 running to bellows 20. A three-way valve 70 is mounted in the joint connecting ducts 66 and 68. By turning the valve, air can be drawn alternatively through either chamber 56 or 58.

Valve 70 can be linked to latch 64 so that when the latch is opened, the valve is automatically turned to draw air into chamber 58. Consequently, when the filter material is dumped from chamber 56, the filter in chamber 58 is ready for operation should chamber 56 be prematurely opened.

Having now described the means by which the objects of the invention are obtained, I claim:

1. In the combination of an air raid shelter and a unitary combined air filter and escape shaft externally of said shelter with its upper end opened to the atmosphere and its lower portion substantially co-extensive with a vertical wall of the shelter and communicating therewith through a doorway in said wall, a door in said doorway, granular filter material resting on the bottom of said shaft, and filling at least a portion of said shaft without permanently blocking said shaft against egress by persons in the shelter, a duct extending from within said filter material into said shelter, filter supporting means covering the inlet end of said duct for spacing the material away from said duct, an air bellows in said shelter removably connected to said duct for drawing air through said shaft, filter material, filter material support means and duct into said shelter, and said filter material being dischargeable into said shelter upon the opening of said door.

2. In the combination of claim 1, manually operable closure means for holding said door closed in said doorway.

3. In the combination of claim 2, hinge means holding said door to said wall for swinging into said shelter.

4. In the combination of claim 1, a fixed partition partially closing said doorway with said door closing the remainder thereof, and said air bellows being fastened to said door.

5. In the combination of claim 4, said door being located beneath said partition.

6. In the combination of claim 5, locking means for removably fastening said door to said partition.

References Cited in the file of this patent

UNITED STATES PATENTS

| | | |
|---|---|---|
| 2,242,378 | Vollbach | May 20, 1941 |
| 2,704,983 | Dronkelaar | Mar. 29, 1955 |

FOREIGN PATENTS

| | | |
|---|---|---|
| 862,182 | France | Nov. 30, 1940 |
| 304,751 | Switzerland | Jan. 31, 1955 |
| 1,001,898 | Germany | Jan. 31, 1957 |